US008334472B2

(12) United States Patent
Sheng et al.

(10) Patent No.: US 8,334,472 B2
(45) Date of Patent: Dec. 18, 2012

(54) AUTOMATIC DOCUMENT FEEDER ASSEMBLY CAPABLE OF SORTING ORIGINALS

(75) Inventors: Thomas Sheng, Hsinchu (TW); Charlie Chou, Hsin Chu (TW)

(73) Assignee: Avision Inc. (TW)

( * ) Notice: Subject to any disclaimer, the term of this patent is extended or adjusted under 35 U.S.C. 154(b) by 1436 days.

(21) Appl. No.: 11/397,686

(22) Filed: Apr. 5, 2006

(65) Prior Publication Data

US 2006/0233577 A1 Oct. 19, 2006

(30) Foreign Application Priority Data

Apr. 13, 2005 (TW) ................................ 94111604 A

(51) Int. Cl.
*G06K 9/00* (2006.01)

(52) U.S. Cl. .......................... 209/584; 209/583; 209/900

(58) Field of Classification Search .................. 209/583, 209/584, 900; 702/223–227
See application file for complete search history.

(56) References Cited

U.S. PATENT DOCUMENTS

| | | | | |
|---|---|---|---|---|
| 4,693,373 | A * | 9/1987 | Lamb et al. | 209/3.3 |
| 5,441,141 | A * | 8/1995 | Bonnet | 198/370.03 |
| 6,126,163 | A * | 10/2000 | Katsuta et al. | 271/223 |
| 6,323,452 | B1 * | 11/2001 | Bonnet | 209/583 |
| 6,626,298 | B2 * | 9/2003 | Lax | 209/534 |
| 2006/0124512 | A1 * | 6/2006 | Quine et al. | 209/584 |

* cited by examiner

*Primary Examiner* — Joseph C Rodriguez
*Assistant Examiner* — Kalyanavenkateshware Kumar

(57) ABSTRACT

In a feeder assembly, an automatic document feeder is electrically connected to a scan-sorting unit. The scan-sorting unit scans, one by one, front sides of originals fed by the automatic document feeder to obtain a plurality of original image signals, and sorts, one by one, the original image signals to output a plurality of sorting signals. The automatic document feeder includes a sheet input tray, a sheet output module and a sheet-feeding mechanism. The sheet-feeding mechanism feeds the originals from the sheet input tray to the sheet output module. The sheet output module is configured to sort the originals into a plurality of original groups placed in the sheet output module according to the sorting signals. The scan-sorting unit sorts the original image signals into signal groups corresponding to the original groups according to the sorting signals, and stores the original image signals according to the signal groups.

10 Claims, 4 Drawing Sheets

AUTOMATIC DOCUMENT FEEDER ASSEMBLY CAPABLE OF SORTING ORIGINALS

BACKGROUND OF THE INVENTION

1. Field of the Invention

The invention relates to an automatic document feeder assembly capable of sorting originals, and more particularly to an automatic document feeder assembly, which includes an automatic document feeder cooperating with a scan-sorting unit to scan a plurality of originals and sorts different types of originals into different groups to be placed in a sheet output module of the automatic document feeder according to the scanned original images.

2. Description of the Related Art

A large-sized copier typically has a sorter for sorting copied pages when a user is copying one original, which includes multiple pages, into multiple copied documents each including multiple copied pages. For example, when the user wants to copy an original having five pages into ten copied documents each having five copied pages, the sorter can place the ten copied documents in ten sheet output trays, respectively, or place ten copied pages of the first to the fifth pages in five sheet output trays, respectively, according to the user's selection. The above-mentioned sorter, which is large in size and thus occupies a relatively large space in the office, only can sort the copied documents or copied pages.

Currently, a mail sorter for sorting mails according to the postal codes on the mails is available in the market. This mail sorter utilizes a belt transporting system having a transmission belt as a carrier to carry and transport standard mails. The area of the mail to be captured is usually located at one of the four corners or within a specific range. The whole image of the mail is meaningless to the mail sorter. So, it is unnecessary to store the whole image of the mail. Alternatively, using this mail sorter also cannot obtain a high-resolution image signal. In this example, the belt transporting system also has to occupy a relatively large space, which is disadvantageous to the small office.

Although the automatic document feeder for the current sheet-fed scanner can scan various types of originals, these originals cannot be sorted according to their colors, sizes and authenticity/counterfeit. So, the user has to sort these originals manually.

In the department of filing invoices or receipts or recognizing the true invoices or receipts, the above-mentioned scanner can be used to scan the originals to obtain electric files, and then recognize and file the electric files. However, the original invoices or receipts transported to the same sheet output tray usually have to be reserved, and the user only can manually sort the originals one by one in a troublesome manner.

SUMMARY OF THE INVENTION

It is therefore an object of the invention to provide an automatic document feeder assembly capable of scanning a plurality of originals and sorting the originals according to the scanned original images, such that different types of originals can be sorted and placed in a sheet output module of the automatic document feeder assembly.

To achieve the above-identified object, the invention provides an automatic document feeder assembly including a scan-sorting unit and an automatic document feeder. The scan-sorting unit scans, one by one, front sides of a plurality of originals fed by the automatic document feeder to obtain a plurality of original image signals, and sorts, one by one, the original image signals to output a plurality of sorting signals. The automatic document feeder includes a sheet input tray, a sheet output module and a sheet-feeding mechanism for feeding the originals from the sheet input tray to the sheet output module. The sheet output module sorts the originals into a plurality of original groups according to the sorting signals and stores the originals according to the original groups. The scan-sorting unit sorts the original image signals into a plurality of signal groups corresponding to the original groups according to the sorting signals, and stores the original image signals according to the signal groups.

Accordingly, the automatic document feeder assembly of the invention can sort the originals according to the sizes, colors, authenticity/counterfeit or simplex/duplex modes of the originals.

DETAILED DESCRIPTION OF THE INVENTION

Figure 1:
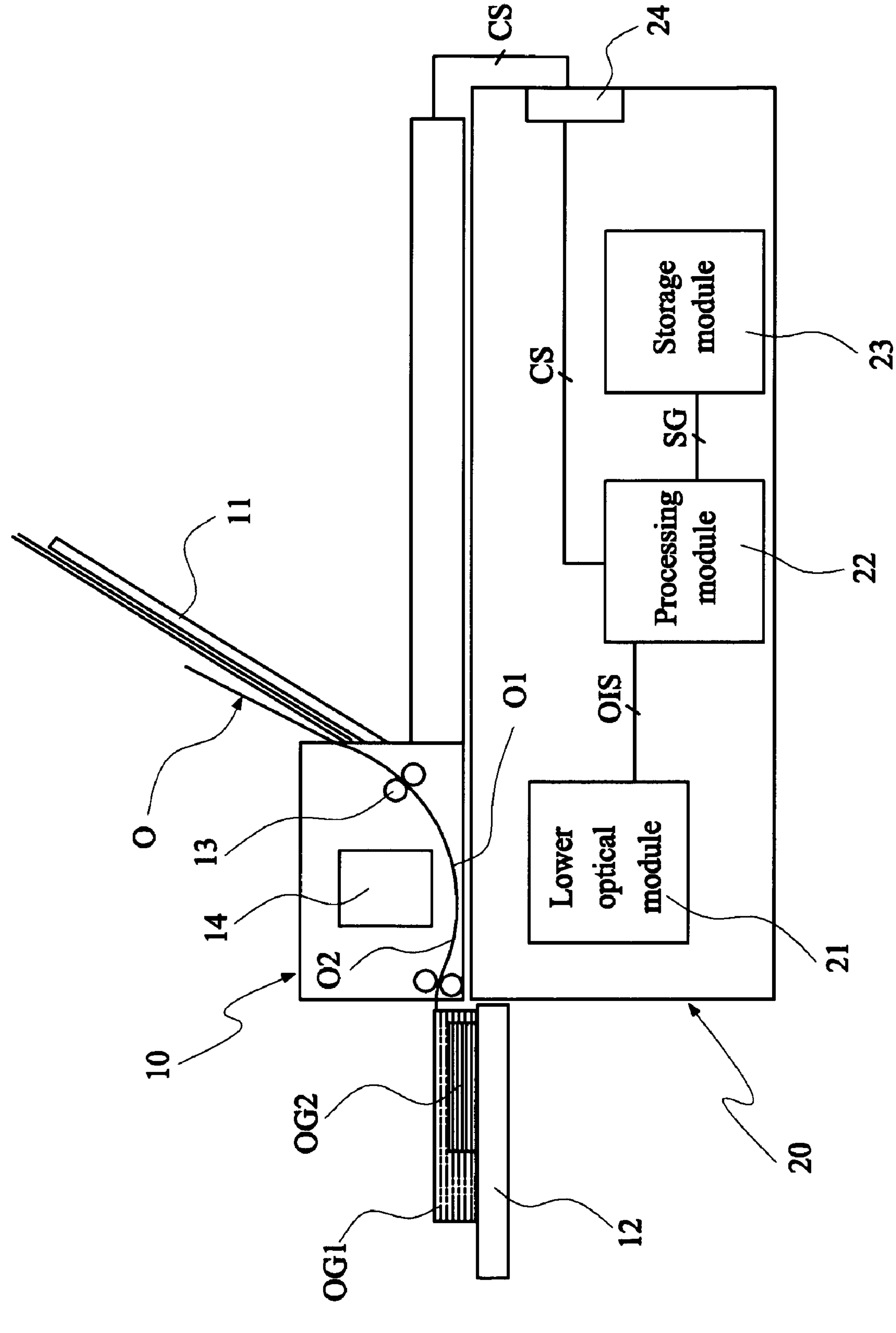
FIG. 1 is a schematic illustration showing an automatic document feeder assembly of the invention.

FIG. 1 is a schematic illustration showing an automatic document feeder 10 of the invention cooperating with a scan-sorting unit 20. As shown in FIG. 1, the automatic document feeder 10 is electrically connected to the scan-sorting unit 20 to constitute an automatic document feeder assembly. The scan-sorting unit 20 may be a scanner or may be composed of a scanner and a host computer, which is connected to the scanner in a local connection manner (e.g., through the USB interface, EPP interface or IEEE1394 interface) or in a remote connection manner (e.g., through the network interface). That is, the scanner itself may have the functions of scanning, sorting and storing, or the scanner itself only has the function of scanning while the functions of sorting and storing are executed in the host computer. In this embodiment, the scanner itself has the functions of scanning, sorting, and storing files.

The automatic document feeder 10 includes a sheet input tray 11, a sheet output module 12 and a sheet-feeding mechanism 13. The sheet-feeding mechanism 13 may be a carrier-free sheet-feeding mechanism, in which no transmission belt is adopted to transmit originals. In this embodiment, the sheet-feeding mechanism comprises two pairs of rollers for directly contacting With one of the originals O, nipping the original O and thus directly transporting the original O. The sheet-feeding mechanism 13 feeds the original O from the sheet input tray 11 to the sheet output module 12. The scan-sorting unit 20 has a lower optical module 21, a processing module 22, a storage module 23 and an input/output interface 24. The scan-sorting unit 20 utilizes the lower optical module 21 for scanning, one by one, face sides O1 of the originals O fed by the automatic document feeder 10 to obtain a plurality of original image signals OIS. Then, the processing module 22 of the scan-sorting unit 20 receives the original image signals OIS, and sorts, one by one, the original image signals OIS to output a plurality of sorting signals CS through the input/output interface 24. The sheet output module 12 receives the sorting signals CS and sorts the originals O into a plurality of original groups OG1 and OG2 to be placed in the sheet output module 12 according to the sorting signals CS.

The scan-sorting unit 20 can sort these original image signals OIS according to the sizes, colors, authenticity/counterfeit or simplex/duplex modes of the originals O. In order to determine whether the original pertains to the simplex or duplex original, the automatic document feeder 10 may further include an upper optical module 14 for scanning backsides O2 of the originals O to obtain backside image signals to be transmitted to the scan-sorting unit 20 such that the scan-sorting unit 20 can make the determination according to the backside image signals.

The scan-sorting unit 20 may also sort the original image signals OIS into a plurality of signal groups SO, which corresponds to the original groups OG1 and OG2 and is to be stored in the storage module 23 of the scan-sorting unit 20, according to these sorting signals CS.

In order to simplify the drawings, the same symbol may be used to denote the member having the similar property but somewhat different structures in the following embodiments.

Figure 3:
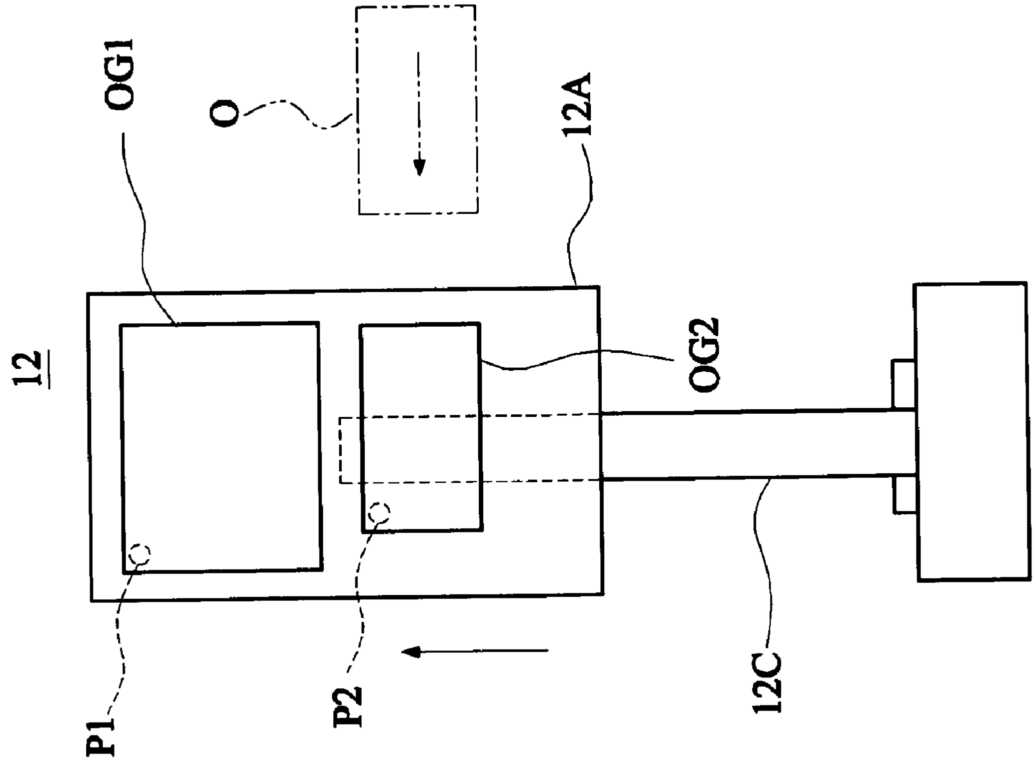
FIG. 3 is a schematic illustration showing a second state of the sheet output module according to the first embodiment of the invention.
Figure 2:
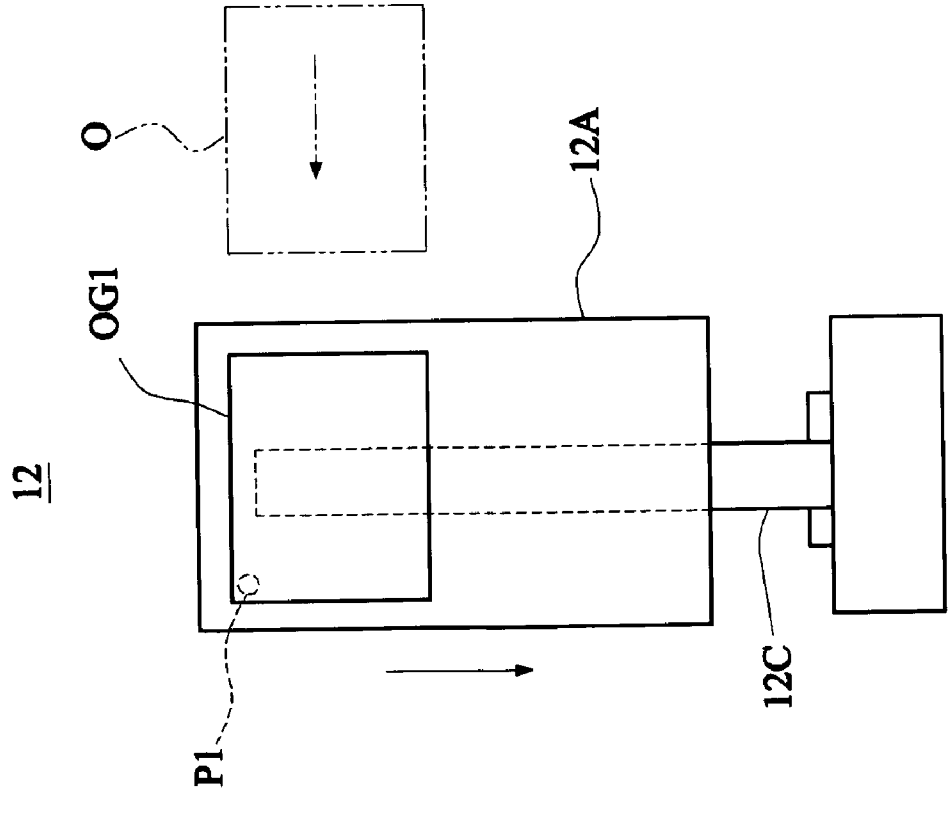
FIG. 2 is a schematic illustration showing a first state of a sheet output module according to a first embodiment of the invention.

FIGS. 2 and 3 are schematic illustrations showing the first and second states of the sheet output module 12 according to a first embodiment of the invention. Referring to FIGS. 2 and 3, the sheet output module 12 includes a sheet output tray 12A and a sheet-output-tray driving mechanism 12C. The sheet output tray 12A stores the originals O of the original groups OG1 and OG2 at a plurality of positions P1 and P2. The sheet-output-tray driving mechanism 12C moves the sheet output tray 12A to receive the originals O of the original groups OG1 and OG2 at the positions P1 and P2 according to the sorting signals CS. In this embodiment, the adopted sheet-output-tray driving mechanism 12C is a lead screw driven by a motor, and the moving direction of the sheet output tray 12A is perpendicular to the moving direction of the original O.

Figure 4:
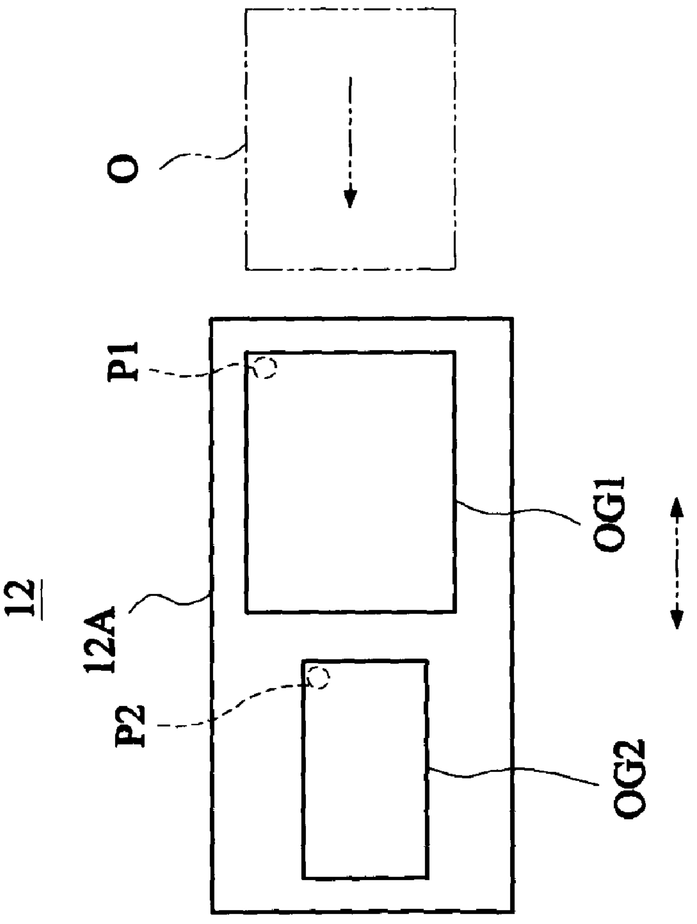
FIG. 4 is a schematic illustration showing a sheet output module according to a second embodiment of the invention.

FIG. 4 is a schematic illustration showing a sheet output module according to a second embodiment of the invention. This embodiment is similar to the first embodiment except that the moving direction of the sheet output tray 12A is parallel to the moving direction of the original O.

Figure 5:
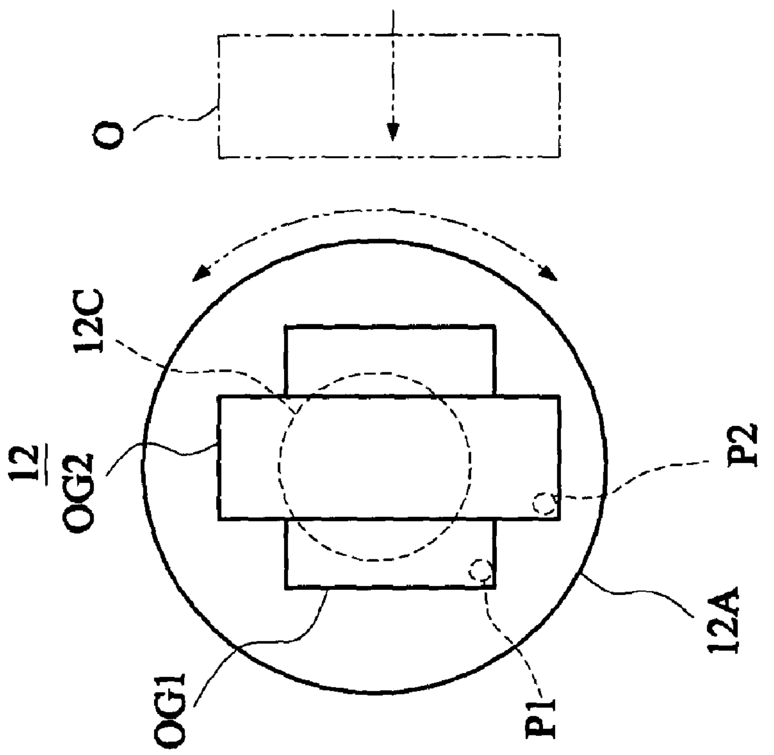
FIG. 5 is a schematic illustration showing a sheet output module according to a third embodiment of the invention.

FIG. 5 is a schematic illustration showing a sheet output module according to a third embodiment of the invention. As shown in FIG. 5, this embodiment is similar to the first embodiment because the sheet output module 12 includes a sheet output tray 12A and a sheet-output-tray driving mechanism 12C. The sheet output tray 12A stores the originals O of the original groups OG1 and OG2 at a plurality of positions P1 and P2. The sheet-output-tray driving mechanism 12C, such as a motor, rotates the sheet output tray 12A to receive the originals O of the original groups OG1 and OG2 at the positions P1 and P2 according to the sorting signals CS. That is, the sheet output module 12 stacks the originals O of the original groups OG1 and OG2 alternately, and the originals O of the original groups OG1 and OG2 overlap with one another or each other.

Instead of placing the original groups at the positions in the first to third embodiments, the original groups may also be placed in a plurality of sheet output trays. Thus, the sheet output module may include a plurality of sheet output trays and a sheet-output-tray driving mechanism. The sheet output trays respectively store the originals of the original groups. The sheet-output-tray driving mechanism moves or rotates the sheet output trays to receive the originals of the original groups according to the sorting signals.

Figure 6:
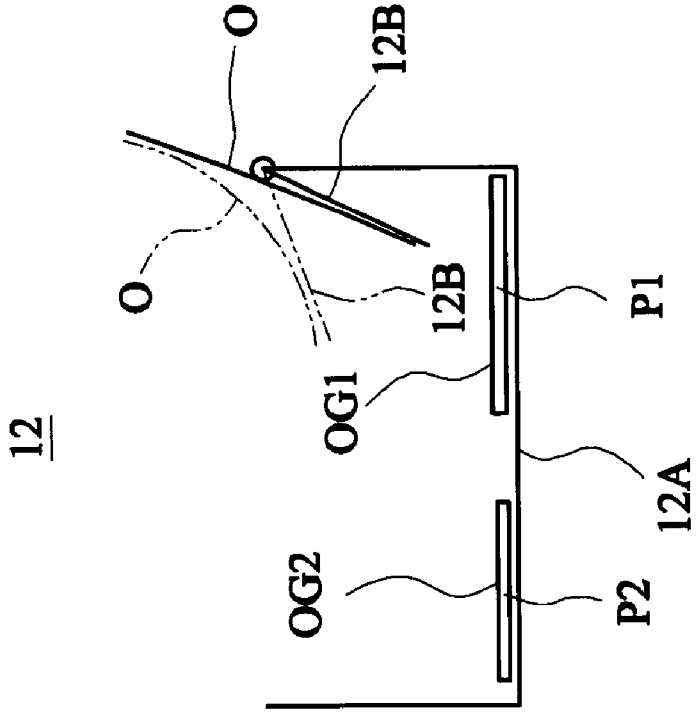
FIG. 6 is a schematic illustration showing a sheet output module according to a fourth embodiment of the invention.

FIG. 6 is a schematic illustration showing a sheet output module according to a fourth embodiment of the invention. As shown in FIG. 6, the sheet output module 12 of this embodiment includes a sheet output tray 12A and an original guiding member 12B. The sheet output tray 12A stores the originals O of the original groups OG1 and OG2 at a plurality of positions P1 and P2. The original guiding member 12B may be rotated to guide the originals O of the original groups OG1 and OG2 to the positions P1 and P2 of the sheet output tray 12A.

Figure 7:
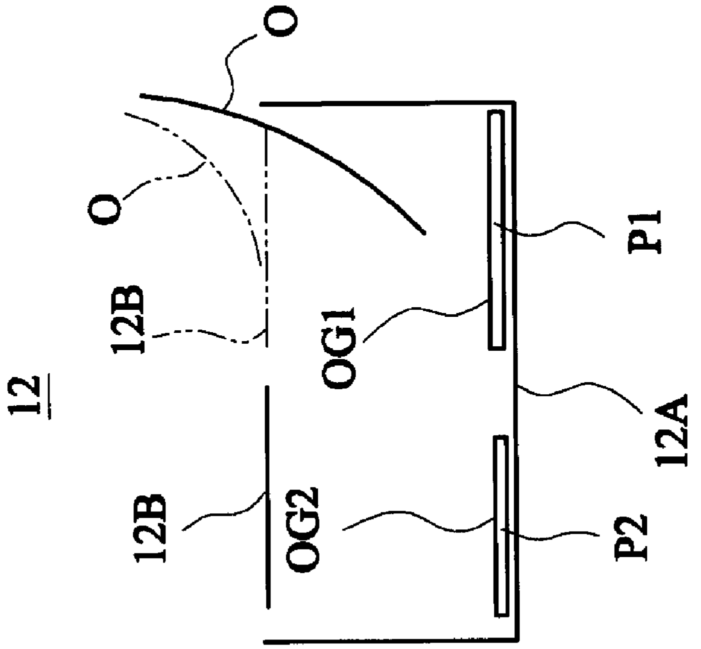
FIG. 7 is a schematic illustration showing a sheet output module according to a fifth embodiment of the invention.

FIG. 7 is a schematic illustration showing a sheet output module according to a fifth embodiment of the invention. As shown in FIG. 7, this embodiment is similar to the fourth embodiment except that the original guiding member 12B may be moved leftward/rightward to guide the originals O of the original groups OG1 and OG2 to the positions P1 and P2 of the sheet output tray 12A.

Similarly, instead of placing a plurality of original groups at a plurality of positions in the fourth to fifth embodiments, it is also possible to place a plurality of original groups in a plurality of sheet output trays. Thus, the sheet output module may include a plurality of sheet output trays and an original guiding member. The sheet output trays respectively store the originals of the original groups. The original guiding member may be moved or rotated to guide the originals of the original groups to the sheet output trays.

According to the embodiments of the invention, the automatic document feeder assembly can perform a sorting procedure according to the sizes, colors, authenticity/counterfeit or simplex/duplex modes of the originals so as to eliminate the operation of the user to manually sort the originals and also to file the electric files, which are obtained after the originals are scanned, according to the properties of the originals. Thus, when the user gets multiple originals with different properties, he or she can directly send the originals to the automatic document feeder assembly of the invention in order to sort the originals and the files. Because it takes a lot of time to scan many originals, the user can deal with other works during this period of time such that the effects of timesaving and laborsaving can be effectively achieved when the originals are sorted.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. An automatic document feeder assembly, comprising:

a scan-sorting unit; and an automatic document feeder electrically connected to the scan-sorting unit, the scan-sorting unit scanning, one by one, front sides of a plurality of originals fed by the automatic document feeder to obtain a plurality of original image signals and sorting, one by one, the original image signals to output a plurality of sorting signals, the automatic document feeder comprising a sheet input tray, a sheet output module and a sheet-feeding mechanism for feeding the originals from the sheet input tray to the sheet output module, wherein:

the sheet output module sorts the originals into a plurality of original groups according to the sorting signals and stores the originals according to the original groups; and the scan-sorting unit sorts the original image signals into a plurality of signal groups corresponding to the original groups according to the sorting signals, and stores the original image signals according to the signal groups.

2. The feeder assembly according to claim 1, wherein the sheet-feeding mechanism is a carrier-free sheet-feeding mechanism.

3. The feeder assembly according to claim 1, wherein the scan-sorting unit sorts the original image signals to output the sorting signals according to sizes, colors, authenticity/counterfeit or simplex/duplex modes of the originals.

4. The feeder assembly according to claim 1, further comprising:

an upper optical module for scanning backsides of the originals.

5. The feeder assembly according to claim 1, wherein the sheet output module comprises:

a sheet output tray for storing the originals of the original groups at a plurality of positions; and a sheet-output-tray driving mechanism for moving or rotating the sheet output tray to receive the originals of the original groups at the positions according to the sorting signals.

6. The feeder assembly according to claim 1, wherein the sheet output module comprises:

a sheet output tray for storing the original groups at a plurality of positions; and an original guiding member, which is moved or rotated to guide the originals of the original groups to the positions of the sheet output tray.

7. The feeder assembly according to claim 1, wherein the sheet output module comprises:

a plurality of sheet output trays for storing the originals of the original groups, respectively; and a sheet-output-tray driving mechanism for moving or rotating the sheet output trays to receive the originals of the original groups according to the sorting signals.

8. The feeder assembly according to claim 1, wherein the sheet output module comprises:

a plurality of sheet output trays for storing the originals of the original groups, respectively; and an original guiding member, which is moved or rotated to guide the originals of the original groups to the sheet output trays.

9. The feeder assembly according to claim 1, wherein the sheet-feeding mechanism comprises a pair of rollers for directly contacting with one of the originals, nipping the original and thus directly transporting the original.

10. The feeder assembly according to claim 1, wherein the sheet output module stacks the originals of the original groups alternately, and the originals of the original groups overlap with one another or each other.

* * * * *